United States Patent

Shtarkman

[11] Patent Number: 5,176,368
[45] Date of Patent: Jan. 5, 1993

[54] VEHICLE ENGINE MOUNT

[75] Inventor: Emil M. Shtarkman, Southfield, Mich.

[73] Assignee: TRW Inc., Lyndhurst, Ohio

[21] Appl. No.: 819,783

[22] Filed: Jan. 13, 1992

[51] Int. Cl.$^5$ .............................................. F16M 1/00
[52] U.S. Cl. .............................. 267/140.14; 267/141.1; 267/140.15; 188/267
[58] Field of Search .............. 188/267; 267/140.1 AE, 267/141.4, 219; 248/550, 562, 566, 636, 638

[56] References Cited

U.S. PATENT DOCUMENTS

| | | |
|---|---|---|
| 3,059,915 | 10/1962 | Kemelhor . |
| 4,733,758 | 3/1988 | Ducles et al. ........................ 188/267 |
| 4,759,534 | 7/1988 | Härtel ................... 188/267 |
| 4,858,733 | 8/1989 | Noguchi et al. ..................... 188/267 |
| 4,869,476 | 9/1989 | Shtarkman ............... 267/140.1 AE |
| 4,899,996 | 2/1990 | Maassen et al. .......... 267/140.1 AE |
| 4,992,190 | 2/1991 | Shtarkman ...................... 267/62.52 |
| 5,052,662 | 10/1991 | Doi ........................ 267/140.1 AE |
| 5,060,919 | 10/1991 | Takano et al. ............. 267/140.1 AE |

FOREIGN PATENT DOCUMENTS

| | | | |
|---|---|---|---|
| 129944 | 8/1982 | Japan ......................... | 267/140.1 AE |
| 0113644 | 7/1983 | Japan ......................... | 267/140.1 AE |

Primary Examiner—Robert J. Oberleitner
Assistant Examiner—Chris Schwartz
Attorney, Agent, or Firm—Tarolli, Sundheim & Covell

[57] ABSTRACT

An engine mount includes a housing connectable to a vehicle chassis and a hub connectable to a vehicle engine. The hub is movable relative to the housing toward and away from each other. A fluid chamber is located between within the hub and the housing and has magnetic fluid contained therein. An inner cylinder is concentric with an outer cylinder. The inner and outer cylinders are movable in the fluid chamber. An outer electromagnetic assembly is fixedly connected to the housing and is located between the housing and the outer cylinder. An inner electromagnetic assembly is fixedly connected to the hub and is located in a space interior of the inner cylinder. The outer electromagnetic assembly and the outer cylinder define an outer annular gap therebetween. The inner electromagnetic assembly and the inner cylinder define an inner annular gap therebetween. The inner and outer electromagnetic assemblies are selectively energizeable for controlling the shear strength and the apparent viscosity of the magnetic fluid in the inner and outer annular gaps to thereby control relative movement of the hub and the housing and thus relative movement of the vehicle chassis and the vehicle engine.

21 Claims, 4 Drawing Sheets

VEHICLE ENGINE MOUNT

BACKGROUND OF THE INVENTION

1. Technical Field

The present invention relates to an apparatus for damping oscillatory movement between parts, and particularly relates to a vehicle engine mount for damping engine vibrations.

2. Background Art

Devices for damping oscillatory movement between parts are well known. Certain of such devices include a field responsive fluid such as an electrorheological fluid, a ferro fluid or a magnetic fluid. The apparent viscosity of the fluid in such devices varies as a function of the magnitude of an energy field applied to the fluid. By controlling the apparent viscosity of the fluid, the damping characteristics of the device can be controlled.

A spring having a field responsive fluid and means for applying an energy field to the fluid is disclosed in U.S. Pat. No. 4,869,476, issued on Sep. 26, 1989 and assigned to the assignee of the present invention. By varying the energy field applied to the fluid, spring characteristics such as spring rate and load-carrying capacity can be varied. The spring is connectable between relatively movable parts to resist movement between the parts and to urge the parts to an initial position when the parts are moved therefrom.

A known damping device using magnetic fluid to control operating characteristics of the device is disclosed in U.S. Pat. No. 3,059,915. The device of U.S. Pat. No. 3,059,915 controls flow of a magnetic fluid through a passage. The rate of fluid flow through the fluid passage varies as a function of the magnitude of a magnetic field applied to the fluid in the fluid passage. The damping characteristics of the device depend upon the rage of fluid flow through the fluid passage.

SUMMARY OF THE INVENTION

The present invention is directed to an apparatus for controlling relative movement of parts. The apparatus comprises means defining a fluid chamber filled with a field responsive fluid. The means includes a first flexible wall for connection with one of the parts. The fluid chamber has a control chamber portion defined by a first portion of the flexible wall and a main chamber portion defined by a second portion of the flexible wall. The apparatus further includes means defining a gap (orifice) for fluid to move between the control chamber portion and the main chamber portion upon relative movement of the parts.

A field producing means energizeable through an energization range controls the shear strength of the field responsive fluid in the gap to thereby control flexing of the first portion of the flexible wall and thus relative movement of the parts. The field producing means is energizeable at a predetermined energization level to stop movement of the field responsive fluid in the gap to thereby prevent flexing of the first portion of the first flexible wall. The second portion of the flexible wall flexes when the parts move relative to each other and the first portion of the flexible wall is prevented from flexing.

The apparatus of the present invention is particularly suitable for use as a vehicle engine mount for damping movement between a vehicle engine and a vehicle chassis. The engine mount comprises a housing connectable to the chassis and a hub connectable to the engine. The hub is movable toward and away from the housing. The fluid chamber is located between the housing and hub and has a fluid responsive to a magnetic field such as a ferro fluid or magnetic fluid contained therein.

The engine mount further includes an inner cylinder and an outer cylinder concentric with the inner cylinder. The inner and outer cylinders are movable in the field responsive fluid in the fluid chamber. An outer electromagnetic assembly is fixedly connected to the housing and is located between the housing and the outer cylinder. An inner electromagnetic assembly is fixedly connected to the hub and is located in a space interior of the inner cylinder. The outer electromagnetic assembly and the outer cylinder define an outer annular gap therebetween. The inner electromagnetic assembly and the inner cylinder define an inner annular gap therebetween. The inner and outer electromagnetic assemblies are selectively energizeable for controlling the apparent viscosity of the fluid and the shear strength of the fluid in the inner and outer annular gaps to thereby damp movement between the hub and the housing and thus movement between the engine and the chassis.

A flexible membrane separates the main chamber portion containing the fluid and an inner gas chamber located in the inner electromagnetic assembly. The flexible membrane yields and deforms against the pressure of the gas in the inner gas chamber in response to the hub moving toward the housing. The flexible membrane and the gas in the inner gas chamber cooperate to resist movement of the hub toward the housing and thus movement of the vehicle engine toward the vehicle chassis. In one embodiment of the present invention, the gas disposed in the inner gas chamber is nitrogen. In another embodiment of the present invention, a foamed cell piece made of polyurethane is located in the inner gas chamber. The foamed cell piece acts to attenuate acoustic noise created by the vehicle engine.

A rubber diaphragm separates the fluid chamber containing the fluid and an outer gas chamber containing pressurized gas. The rubber diaphragm yields and deforms against the pressure of the gas in the outer gas chamber in response to the hub moving toward the housing. The rubber diaphragm and the gas in the outer gas chamber cooperate to resist movement of the hub toward the housing and thus movement of the vehicle engine toward the vehicle chassis.

BRIEF DESCRIPTION OF THE DRAWINGS

The foregoing and other features of the present invention will become apparent to one skilled in the art to which the present invention relates upon reading the following description of the invention with reference to the accompanying drawings, wherein.

DESCRIPTION OF PREFERRED EMBODIMENTS

Figure 1:
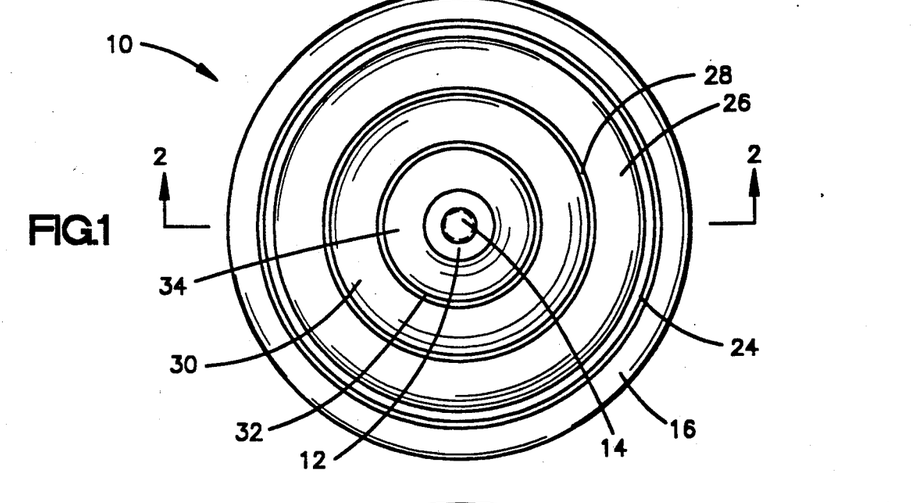
FIG. 1 is a top view of an engine mount constructed in accordance with the present invention.

The present invention relates to an apparatus connectable between movable parts for resisting relative movement of the parts, damping vibrations, and attenuating acoustic noise created by at least one of the parts. The specific construction and use of the apparatus may vary. An apparatus constructed in accordance with the present invention is particularly suitable for use as a vehicle engine mount for damping movement between a vehicle engine and a vehicle chassis. An engine mount 10 embodying the present invention is illustrated in FIG. 1. The engine mount 10 is connected between a vehicle engine 11 and a vehicle chassis 13.

Figure 2:
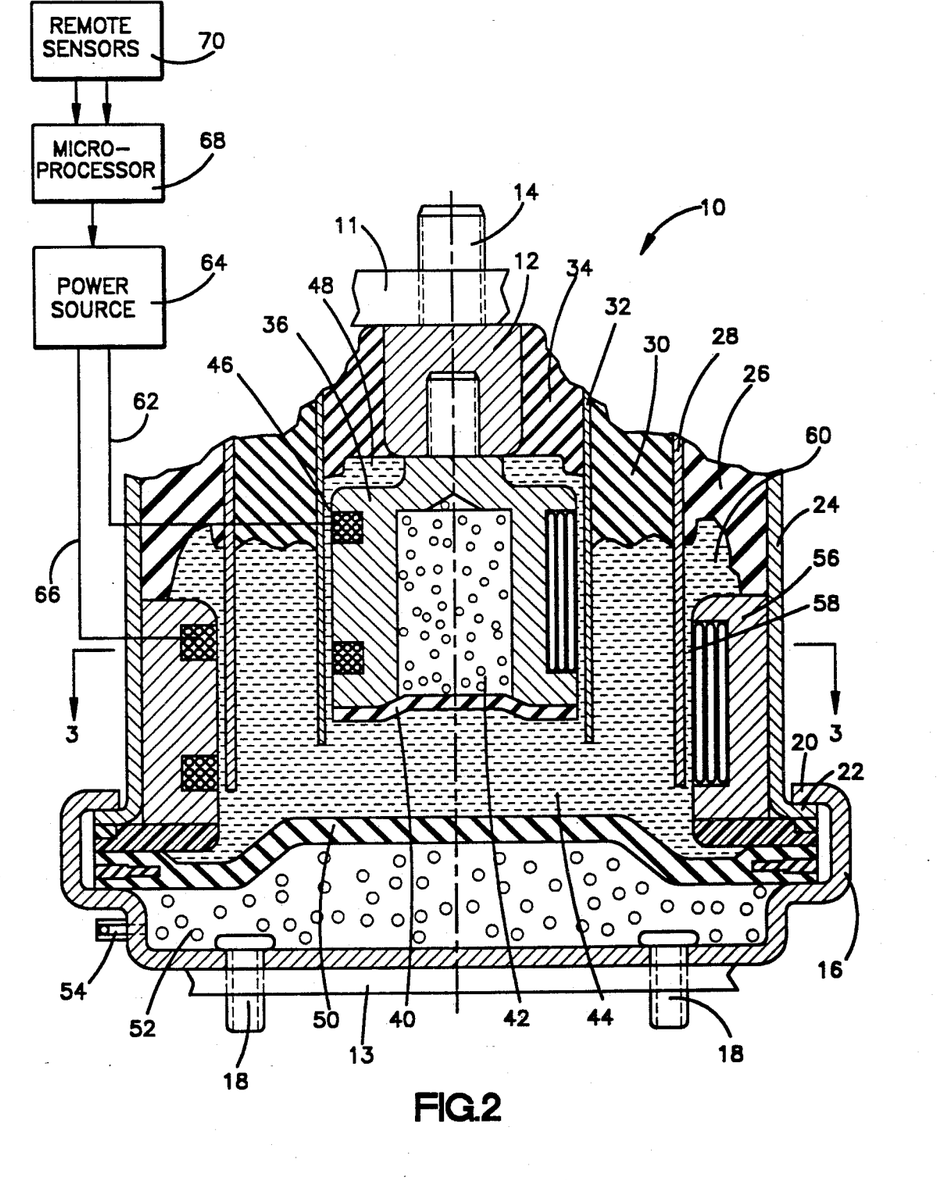
FIG. 2 is a cross-sectional view taken approximately along the line 2—2 of FIG. 1.
Figure 3:
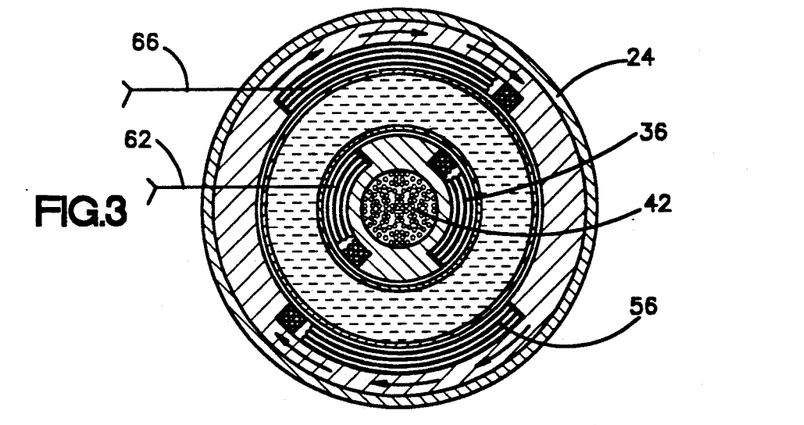
FIG. 3 is a schematic cross-sectional view, taken approximately along the line 3—3 of FIG. 2.

Referring to FIGS. 1-3, the engine mount 10 is shown in an initial position and includes a hub 12 having a stud 14 which connects the engine mount 10 to the vehicle engine 11. The engine mount 10 further includes an outer cylindrical housing portion 16 having a pair of threaded studs 18 which connect the engine mount 10 to the vehicle chassis 13. The outer housing portion 16 has a lip 20 which overlies a lip 22 of an inner cylindrical housing portion 24.

An annular-shaped elastomeric spring 26 is flexibly connected between one end of the inner housing portion 24 and one end of an outer cylinder 28. Preferably, the outer cylinder 28 has an inner diameter of about three and one-half inches. An annular-shaped elastomeric spring 30 is flexibly connected between one end of the outer cylinder 28 and one end of an inner cylinder 32. Preferably, the inner cylinder 32 has an inner diameter of about two inches. An annular-shaped elastomeric spring 34 is flexibly connected between one end of the inner cylinder 32 and the hub 12. The three elastomeric springs 26, 30, 34 form a flexible wall which yields and deforms in response to relative movement of the hub 12 and the outer housing portion 16 and thus relative movement of the vehicle engine 11 and the vehicle chassis 13.

The outer cylinder 28 and the inner cylinder 32 are each made of magnetically conductive material such as ferromagnetic steel. The composition of each of the elastomeric springs 26, 30, 34 is a natural rubber-based compound. Preferably, the compound includes natural rubber and carbon black. Also, preferably, the inner surface of each of the elastomeric springs 26, 30, 34 is coated with Chemglaze Z202 manufactured by Lord Corporation located in Erie, Pa.

An inner electromagnetic assembly 36 is located adjacent the hub 12. One end of the inner electromagnetic assembly 36 is fixedly connected to the hub 12. A flexible membrane 40 is located at the other end of the inner electromagnetic assembly 36. The flexible membrane 40 separates an inner gas chamber 42 located in the interior of the inner electromagnetic assembly 36 and a fluid chamber containing a ferro fluid or a magnetic fluid. The description below will refer to the fluid chamber containing magnetic fluid but it should be understood that the chamber could instead contain a ferro fluid. A ferro fluid is a colloidal suspension of small magnetic particles.

The fluid chamber containing magnetic fluid has a main chamber portion 44, an annular-shaped control chamber portion 48, and an annular-shaped control chamber portion 60. The volume of the main chamber portion 44 is preferably 326 cubic centimeters. Preferably, the composition of the magnetic fluid comprises solid magnetizable reduced carbonyl iron particles suspended in an oil vehicle, and a suitable dispersant, such as a silica gel. Such a magnetic fluid is disclosed in U.S. Pat. No. 4,992,190 issued on Feb. 12, 1991, and assigned to the assignee of the present application.

The volume of the inner gas chamber 42 is preferably twenty cubic centimeters. Preferably, the inner gas chamber 42 is filled at atmospheric pressure with nitrogen gas. The gas in the inner gas chamber 42 cooperates with the flexible membrane 40 to resist movement of the hub 12 toward the outer housing portion 16 to thereby resist movement of the vehicle engine 11 toward the vehicle chassis 13. Like the elastomeric springs 26, 30, 34, the composition of the flexible membrane 40 is also a natural rubber-based compound having its inner surface coated with Chemglaze Z202. The coating of Chemglaze Z202 on the flexible membrane 40 protects the flexible membrane 40 from absorbing oil in the magnetic fluid. Similarly, the coating of Chemglaze Z202 on each of the elastomeric springs 26, 30, 34 protects the elastomeric spring from absorbing oil in the magnetic fluid.

The main chamber portion 44 containing magnetic fluid is defined in part by the elastomeric spring 30 and the outer and inner cylinders 28, 32. The main chamber portion 44 is also defined in part between the flexible membrane 40 and a rubber diaphragm 50 fixedly connected along its outer periphery to the outer housing portion 16. Like the flexible membrane 40, the composition of the rubber diaphragm 50 is also a natural rubber-based compound having its inner surface coated with Chemglaze Z202. The rubber diaphragm 50 separates the main chamber portion 44 and an outer gas chamber 52 filled with pressurized gas. The outer gas chamber 52 can be filled with pressurized gas through a pressure valve 54. The gas in the outer gas chamber 52 cooperates with the rubber diaphragm 50 to resist movement of the hub 12 toward the outer housing portion 16 to thereby resist movement of the vehicle engine 11 toward the vehicle chassis 13.

The inner electromagnetic assembly 36 and the inner cylinder 32 have an annular gap 46 (or orifice) between them referred to herein as the inner gap. The size of the inner gap 46 is, for example, one millimeter. The annular-shaped control chamber portion 48 is located at the one end of the inner electromagnetic assembly 36. The control chamber portion 48 is defined by the inner cylinder 32, the elastomeric spring 34, and the inner electromagnetic assembly 36. The control chamber portion 48 communicates through the inner gap 46 with the main chamber portion 44.

An outer electromagnetic assembly 56 is located between the inner housing portion 24 and the outer cylinder 28 and is fixedly connected to the inner housing portion 24. The outer electromagnetic assembly 56 and the outer cylinder 28 have an outer annular gap 58 (or orifice) between them referred to herein as the outer gap. The size of the outer gap 58 is, for example, one millimeter. The annular-shaped control chamber portion 60 is located at one end of the outer electromagnetic assembly 56. The control chamber portion 60 is defined by the outer cylinder 28, the elastomeric spring 26, and the outer electromagnetic assembly 56. The control chamber portion 60 communicates through the outer gap 58 with the main chamber portion 44.

The outer electromagnetic assembly 56 has two energizeable coils. One end of one coil of the outer electromagnetic assembly 56 is connectable through line 66 to a positive output terminal of a power source 64. One end of the other coil of the outer electromagnetic assembly 56 is connectable through another line (not shown) to a negative output terminal of the power source 64. When the two coils of the outer electromagnetic assembly 56 are energized by the power source 64, an associated magnetic field is created. Similarly, the inner electromagnetic assembly 36 has two energizeable coils. One end of one coil of the inner electromagnetic assembly 36 is connectable through line 62 to another positive output terminal of the power source 64. One end of the other coil of the inner electromagnetic assembly 36 is connectable through another line (not shown) to another negative terminal of the power source 64. When the two coils of the inner electromagnetic assembly 36 are energized by the power source 64, an associated magnetic field is created.

Figure 4:
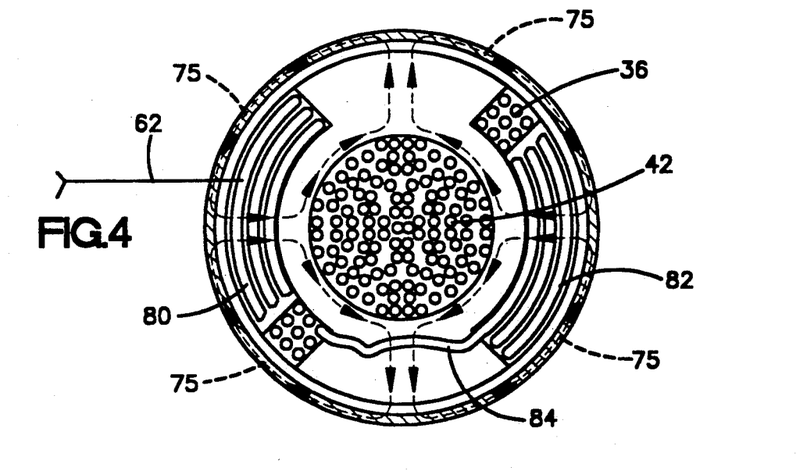
FIG. 4 is an enlarged view of a portion of FIG. 3.

Referring to FIG. 4, an enlarged view of the inner electromagnetic assembly 36 shows the pattern of magnetic flux lines 75 associated with the coils of the inner electromagnetic assembly 36. The pattern of magnetic flux lines (not shown) associated with the coils of the outer electromagnetic assembly 56 is similar to the pattern of magnetic flux lines 75 associated with the coils of the inner electromagnetic assembly 36. The construction of the outer electromagnetic assembly 56 is similar to the construction of the inner electromagnetic assembly 36. For simplicity, the construction of only the inner electromagnetic assembly 36 is described in detail with reference to FIG. 4.

The two coils of the inner electromagnetic assembly 36 are formed by a continuous electrical wire and are located on opposite sides of the inner electromagnetic assembly 36. As illustrated in FIG. 4, one coil designated with the reference numeral 80 is located on the left side of FIG. 4, and the other coil designated with the reference numeral 82 is located on the right side of FIG. 4.

To form the two coils 80, 82 of the inner electromagnetic assembly 36, an electrical conductive wire with an insulating covering is wrapped around a core located on one side of the inner electromagnetic assembly 36 to form one of the coils 80, 82, and is then wrapped around another core located on the opposite of the inner electromagnetic assembly 36 to form the other one of the coils 80, 82. A portion of the electrical wire, designated with reference numeral 84 in FIG. 4, interconnects the two coils 80, 82. One end of the electrical wire extends from the coil 80 and is connectable through line 62 to the power source 64. The other end (not shown) of the electrical wire extends from the coil 82 and is connectable to the power source 64. The two coils 80, 82 are constructed to handle at least 250 amp-turns.

When the magnetic field generated by the inner electromagnetic assembly 36 is applied to the magnetic fluid in the inner gap 46, the ferromagnetic particles in the magnetic fluid in the inner gap 46 form chains of particles extending along the lines of magnetic flux in the magnetic fluid. When the chains of particles are formed, the chains of particles are magnetically bonded together. The shear strength of the magnetic fluid in a direction normal to the direction of extension of the chains of particles depends upon the strength of the bond and thus the strength of the magnetic field. The shear strength of the magnetic fluid in the inner gap 46 changes as the magnetic field acting on the fluid changes. Thus, as the magnetic field changes, the apparent viscosity of the magnetic fluid changes.

Similarly, when the magnetic field generated by the outer electromagnetic assembly 56 is applied to the magnetic fluid in the outer gap 58, the shear strength of the magnetic fluid in the outer gap 58 changes in the same way that the shear strength of the magnetic fluid in the inner gap 46 changes as described hereinabove. Also, the apparent viscosity of the magnetic fluid in the outer gap 58 changes in the same way that the apparent viscosity of the magnetic fluid in the inner gap 46 changes. Thus, the shear strength and the apparent viscosity of the magnetic fluid in the outer gap 58 changes when a magnetic field applied to the magnetic fluid in the outer gap 58 changes.

When both electromagnetic assemblies 36, 56 are de-energized, the shear strength and the apparent viscosity of the magnetic fluid are at minimum. When the shear strength and the apparent viscosity of the magnetic fluid are at minimum, the shear strength and the apparent viscosity of the fluid in the inner and outer gaps 46, 58 are at minimum. When both electromagnetic assemblies 36, 56 are energized at their maximum energization levels, the shear strength and the apparent viscosity of the magnetic fluid are at maximum. When the shear strength and the apparent viscosity of the magnetic fluid are at maximum, the shear strength and the apparent viscosity of the fluid in inner and outer gaps 46, 58 are at maximum.

As shown in FIG. 2, a digital signal processor 68 is operatively connected between the power source 64 and a number of remote sensors 70. The digital signal processor 68 controls the power source 64 in response to signals received from the remote sensors 70. The digital signal processor 68 is, preferably, model number TMS320C25 (ROM version) or model number TMS320E25 (EPROM version), both manufactured by Texas Instruments.

The remote sensors 70, such as acceleration sensors, provide electrical output signals indicative of vehicle engine vibrations. Also, the remote sensors 70 may be used to detect a bump to be encountered by the vehicle while on a smooth highway. As an example, an acceleration sensor of the strain gage type may be used. One such type of acceleration sensor is model number GA-700-2 manufactured by Sunstrand Corp. In response to the electrical output signals from the remote sensors 70, the digital signal processor 68 provides control signals to vary the electrical outputs of the power source 64. The digital signal processor 68 generates control signals in response to the electrical output signals from the remote sensors 70 to control the level of energization of the inner and outer electromagnetic assemblies 36, 56.

The engine mount 10 is shown in FIG. 2 with its parts in the initial position. The parts of the engine mount 10 are in the initial position when the vehicle engine 11 is resting on the engine mount 10 and is not operating. When the parts of the engine mount 10 are in the initial position as shown in FIG. 2, a static load due to the weight of the vehicle engine 11 is applied to the engine mount 10.

Operation When the Vehicle Engine Moves Toward the Vehicle Chassis

Figure 5:
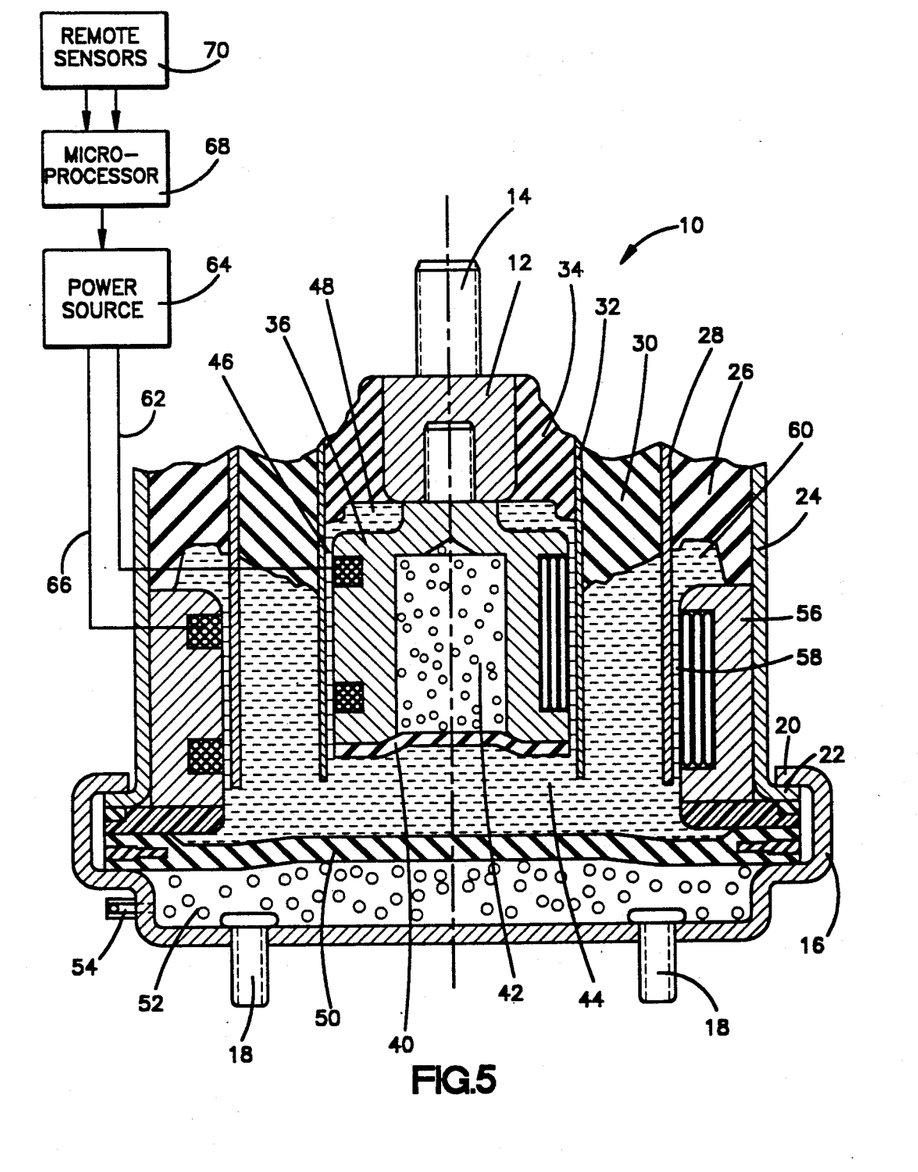
FIG. 5 is a cross-sectional view, similar to FIG. 2, illustrating the engine mount of FIG. 1 in an axially compressed condition.

When the vehicle engine 11 operates at engine idle, the vehicle engine 11 vibrates and, therefore, moves periodically toward and away from the vehicle chassis 13. When the vehicle engine 11 moves toward the vehicle chassis 13, the parts of the engine mount 10 move from the initial position as shown in FIG. 2 to a compressed position such as shown in FIG. 5. When this occurs, each of the elastomeric springs 26, 30, 34 flexes.

When the elastomeric spring 26 flexes in response to the vehicle engine 11 moving toward the vehicle chassis 13, fluid is forced to flow through the outer gap 58 from the control chamber portion 60 to the main chamber portion 44. Similarly, when the elastomeric spring 34 flexes in response to the vehicle engine 11 moving toward the vehicle chassis 13, fluid is forced to flow through the inner gap 46 from the control chamber portion 48 to the main chamber portion 44. The rate of fluid flow through the outer gap 58 depends upon the shear strength and the apparent viscosity of the magnetic fluid in the outer gap 58 and, therefore, the level of energization of the outer electromagnetic assembly 56. Similarly, the rate of fluid flow through the inner gap 46 depends upon the shear strength and the apparent viscosity of the magnetic fluid in the inner gap 46 and, therefore, the level of energization of the inner electromagnetic assembly 36. Although fluid flows from each of the control chamber portions 48, 60 through the inner and outer gaps 46, 58, respectively, to the main chamber portion 44, the volume of fluid contained in the main chamber portion 44, the two control chamber portions 48, 60, and the inner and outer gaps 46, 58 remains constant.

The fluid forced through the outer gap 58 from the control chamber portion 60 to the main chamber portion 44 causes the rubber diaphragm 50 to flex downwardly as viewed in the drawings. Similarly, the fluid forced through the inner gap 46 from the control chamber portion 48 to the main chamber portion 44 causes the rubber diaphragm 50 to flex downwardly. When the rubber diaphragm 50 flexes downwardly, the volume of the outer gas chamber 52 decreases and the pressure of the gas therein increases. The maximum volume change expected in the outer gas chamber 52 is approximately 50% of the original volume.

Also, when the vehicle engine 11 moves toward the vehicle chassis 13, the outer and inner cylinders 28, 32 move toward the rubber diaphragm 50. Although the outer and inner cylinders 28, 32 move toward the rubber diaphragm 50, they do not move into contact with the rubber diaphragm 50. The outer and inner cylinders 28, 32 do not move into contact with the rubber diaphragm 50 because the three elastomeric springs 26, 30, 34 and the gas in the outer gas chamber 52 provide more than enough support so as to allow neither the outer cylinder 28 nor the inner cylinder 32 to come in contact with the rubber diaphragm 50. As an example, assume that the static load due to the weight of the vehicle applied to the engine mount 10 is 200 lbs. of force and that the largest expected dynamic load to be applied to the engine mount 10 is 400 lbs. of force for a maximum combined load of 600 lbs. of force. Based on this assumption, the elastomeric springs 26, 30, 34 may typically be able to support a maximum of 300 lbs. of force and the gas in the outer gas chamber 52 may typically be able to support a maximum of 400 lbs. of force for a combined capability to support a maximum of 700 lbs. of force which is more than enough to support the combined maximum load of 600 lbs. of force applied to the engine mount 10.

When both electromagnetic assemblies 36, 56 are de-energized and the vehicle engine 11 is moving toward the vehicle chassis 13, the shear strength and the apparent viscosity of the magnetic fluid in the inner and outer gaps 46, 58 are at minimum because both electromagnetic assemblies 36, 56 are de-energized. When the shear strength and the apparent viscosity of the magnetic fluid in the inner and outer gaps 46, 58 are at minimum, a relatively soft spring rate and minimum damping are provided. A relatively soft spring rate and minimum damping are provided because the minimum shear strength and the minimum apparent viscosity of the magnetic fluid in the inner and outer gaps 46, 58 allow fluid to flow relatively easily through the inner and outer gaps 46, 58 in response to movement of the vehicle engine 11 toward the vehicle chassis 13.

The operation of each of the electromagnetic assemblies 36, 56 has been described at its minimum (zero) energization level. Each of the electromagnetic assemblies 36, 56 is energizeable through an energization range between the zero and the maximum energization levels. The inner electromagnetic assembly 36 is energizeable through an associated energization range for controlling the shear strength and the apparent viscosity of the magnetic fluid in the inner gap 46 to thereby control movement of the vehicle engine 11 toward the vehicle chassis 13. The magnetic field created by the inner electromagnetic assembly 36 when it is energized acts on the fluid in the inner gap 46 to control the shear strength of the magnetic fluid in the inner gap. Similarly, the outer electromagnetic assembly 56 is energizeable through an associated energization range for controlling the shear strength and the apparent viscosity of the magnetic fluid in the outer gap 58 to thereby control relative movement of the vehicle engine 11 toward the vehicle chassis 13. The magnetic field created by the outer electromagnetic assembly 56 when it is energized acts on the fluid in the outer gap 58 to control the shear strength of the magnetic fluid in the outer gap 58.

When the energization of an electromagnetic assembly is increased above a predetermined energization level, the shear strength and the apparent viscosity of the magnetic fluid are at values sufficient to stop flow of magnetic fluid through its corresponding annular gap. Thus, fluid stops flowing through the inner gap 46 when the inner electromagnetic assembly 36 is energized above its predetermined energization level, and fluid stops flowing through the outer gap 58 when the outer electromagnetic assembly 56 is energized above its predetermined energization level.

When the vehicle engine 11 moves toward the vehicle chassis 13 and the inner electromagnetic assembly 36 is energized above its predetermined level, fluid stops flowing through the inner gap 46 and the shear strength of the fluid in the inner gap 46 is relatively high. Also, when the inner electromagnetic assembly 36 is energized above its predetermined level, the shear strength of the fluid in the inner gap 46 is at a value sufficient to rigidly lock the inner cylinder 32 with the inner electromagnetic assembly 36 to thereby prevent movement of the hub 12 relative to the inner cylinder 32. When the hub 12 is prevented from moving relative to the inner cylinder 32, the elastomeric spring 34 is prevented from flexing. Thus, the elastomeric spring 34 is prevented from flexing when the vehicle engine 11 moves toward the vehicle chassis 13 and the inner electromagnetic assembly 36 is energized above its predetermined level. The predetermined energization level is at about 250 amp-turns for the inner electromagnetic assembly 36.

Similarly, when the vehicle engine 11 moves toward the vehicle chassis 13 and the outer electromagnetic assembly 56 is energized above its predetermined level, fluid stops flowing through the outer gap 58 and the shear strength of the fluid in the outer gap 58 is relatively high. Also, when the inner electromagnetic assembly 36 is energized above its predetermined level, the shear strength of the fluid in the outer gap 58 is at a value sufficient to rigidly lock the outer cylinder 28 with the outer electromagnetic assembly 56 to thereby prevent movement of the outer cylinder 28 relative to the outer housing portion 16. When the outer cylinder 28 is prevented from moving relative to the outer housing portion 16, the elastomeric spring 26 is prevented from flexing. Thus, the elastomeric spring 26 is prevented from flexing when the vehicle engine 11 moves toward the vehicle chassis 13 and the outer electromagnetic assembly 56 is energized above its predetermined level. Preferably, the predetermined energization level is at about 250 amp-turns for the outer electromagnetic assembly 56.

When both electromagnetic assemblies 36, 56 are energized at their maximum levels and the vehicle engine 11 is moving toward the vehicle chassis 13, the shear strength and the apparent viscosity of the magnetic fluid in the inner gap 46 and the shear strength and the apparent viscosity of the magnetic fluid in the outer gap 58 are at maximum because of both electromagnetic assemblies 36, 56 being energized at their maximum energization levels. When the shear strength and the apparent viscosity of the magnetic fluid in the inner and outer gaps 46, 58 are at maximum, fluid flow through the inner gap 46 stops, the inner cylinder 32 is rigidly locked with the inner electromagnetic assembly 36 to prevent the elastomeric spring 34 from flexing, fluid flow through the outer gap 58 stops, and the outer cylinder 28 is rigidly locked with the outer electromagnetic assembly 56 to prevent the elastomeric spring 26 from flexing. The elastomeric spring 30 remains flexible even though the two elastomeric springs 26, 34 are prevented from flexing. Since only the elastomeric spring 30 flexes, a relatively high spring rate of the engine mount 10 is provided when both electromagnetic assemblies 36, 56 are energized at their maximum levels and the vehicle engine 11 moves toward the vehicle chassis 13.

Although operation of the engine mount 10 has been described above with either both electromagnetic assemblies 36, 56 de-energized or both electromagnetic assemblies 36, 56 energized to control the damping rate, it is contemplated that only one of the electromagnetic assemblies 36, 56 may be energized. When only the outer electromagnetic assembly 56, for example, is energized at its maximum energization level, the shear strength and the apparent viscosity of the magnetic fluid in the outer gap 58 is at maximum and the shear strength and the apparent viscosity of the magnetic fluid in the inner gap 46 is at minimum. When the shear strength and the apparent viscosity of the magnetic fluid in the outer gap 58 are at maximum and the shear strength and the apparent viscosity of the magnetic fluid in the inner gap 46 are at minimum, fluid may flow through the inner gap 46 and the elastomeric springs 30, 34 may flex.

After the parts of the engine mount 10 move from the initial position of FIG. 2 to the compressed position as shown in FIG. 5, the elastomeric spring 30 urges the parts of the engine mount 10 to return to the initial position of FIG. 2. If the elastomeric spring 26 is not prevented from flexing, it also urges the parts of the engine mount 10 to return to the initial position of FIG. 2. Similarly, if the elastomeric spring 34 is not prevented from flexing, it also urges the parts of the engine mount 10 to return to the initial position of FIG. 2. Also, the pressure in the outer gas chamber 52 and the resilience of the rubber diaphragm 50 act to urge the parts of the engine mount 10 to the initial position.

Operation When the Vehicle Engine Moves Away From the Vehicle Chassis

When the vehicle engine 11 moves away from the vehicle chassis 13 and upwardly from the position shown in FIG. 2, the hub 12 moves upwardly, as viewed in FIG. 2, away from the outer housing portion 16. When the hub 12 moves away from the outer housing portion 16 and both electromagnetic assemblies 36, 56 are de-energized, the three elastomeric springs 26, 30, 34 flex. When the elastomeric spring 26 flexes in response to the vehicle engine 11 moving upwardly away from the vehicle chassis 13, a vacuum tends to be created in the control chamber portion 60. Thus, pressure in the inner gas chamber 42 presses against the flexible membrane 40 to force fluid in the main chamber portion 44 through the outer gap 58 into the control chamber portion 60. At the same time, pressure in the outer gas chamber 52 presses against the rubber diaphragm 50 to force fluid in the main chamber portion 44 through the outer gap 58 into the control chamber portion 60.

Similarly, when the elastomeric spring 34 flexes in response to the vehicle engine 11 moving upwardly away from the vehicle chassis 13, a vacuum tends to be created in the control chamber portion 48. Thus, pressure in the inner gas chamber 42 presses the flexible membrane 40 to force fluid in the main chamber portion 44 through the inner gap 46 into the control chamber portion 48. At the same time, pressure in the outer gas chamber 52 presses against the rubber diaphragm 50 to force fluid in the main chamber portion 44 through the inner gap 46 into the control chamber portion 48. Thus, the three elastomeric springs 26, 30, 34 flex and the pressures in both the inner gas chamber 42 and the outer gas chamber 52 force fluid in the main chamber portion 44 to flow through the inner and outer gaps 46, 58 into the two control chamber portions 48, 60, respectively, in response to movement of the hub 12 away from the outer housing portion 16 and thus movement of the vehicle engine 11 away from the vehicle chassis 13.

When both electromagnetic assemblies 36, 56 are de-energized and the vehicle engine 11 moves away from the vehicle chassis 13, fluid flows relatively easily through the inner gap 46 and fluid flows relatively easily through the outer gap 58. By allowing fluid to flow relatively easily from the main chamber portion 44 through the inner gap 46 into the control chamber portion 48 in response to the vehicle engine 11 moving away from the vehicle chassis 13, cavitation in the control chamber portion 48 is prevented. Similarly, by allowing fluid to flow relatively easily from the main chamber portion 44 through the outer gap 58 into the control chamber portion 60 in response to the vehicle engine 11 moving away from the vehicle chassis 13, cavitation in the control chamber portion 60 is prevented.

When the inner electromagnetic assembly 36 is energized and the vehicle engine 11 moves away from the vehicle chassis 13, the shear strength of the fluid in the inner gap 46 increases to resist movement of the inner cylinder 32 away from the rubber diaphragm 50. Similarly, when the outer electromagnetic assembly 56 is energized and the vehicle engine 11 moves away from the vehicle chassis 13, the shear strength of the fluid in the outer gap 58 increases to resist movement of the outer cylinder 32 away from the rubber diaphragm 50. Thus, the shear strength of the fluid in the inner and outer gaps 46, 58 resists movement of the vehicle engine 11 away from the vehicle chassis 13 when the inner and outer electromagnetic assemblies 36, 56 are energized and the vehicle engine 11 moves away from the vehicle chassis 13.

When the inner electromagnetic assembly is energized at its maximum energization level and the vehicle engine 11 moves away from the vehicle chassis 13, the shear strength of the fluid in the inner gap 46 is at a value sufficient to rigidly lock the inner cylinder 32 with the inner electromagnetic assembly 36 to thereby prevent the elastomeric spring 34 from flexing. Similarly, when the outer electromagnetic assembly 56 is energized at its maximum energization level and the vehicle engine 11 moves away from the vehicle chassis 13, the shear strength of the fluid in the outer gap 58 is at a value sufficient to rigidly lock the outer cylinder 28 with the outer electromagnetic assembly 56 to thereby prevent the elastomeric spring 26 from flexing. Thus, the two elastomeric springs 26, 34 are prevented from flexing and only the elastomeric spring 30 flexes when both inner and outer electromagnetic assemblies 36, 56 are energized at their maximum energization levels and the vehicle engine 11 moves away from the vehicle chassis 13.

By providing an engine mount 10 having the structure and operation described hereinabove, a desired spring rate and/or damping rate of the engine mount 10 can be achieved. Also, a number of advantages result by using the engine mount 10 having the structure and operation described hereinabove. One advantage is that the engine mount 10 has the capacity to damp vehicle engine vibrations having a wide range of frequencies and a wide range of amplitudes. As an example, the frequencies may range between zero and 500 hertz and the amplitudes may range between 0.05 millimeters and 3.0 millimeters.

Figure 6:
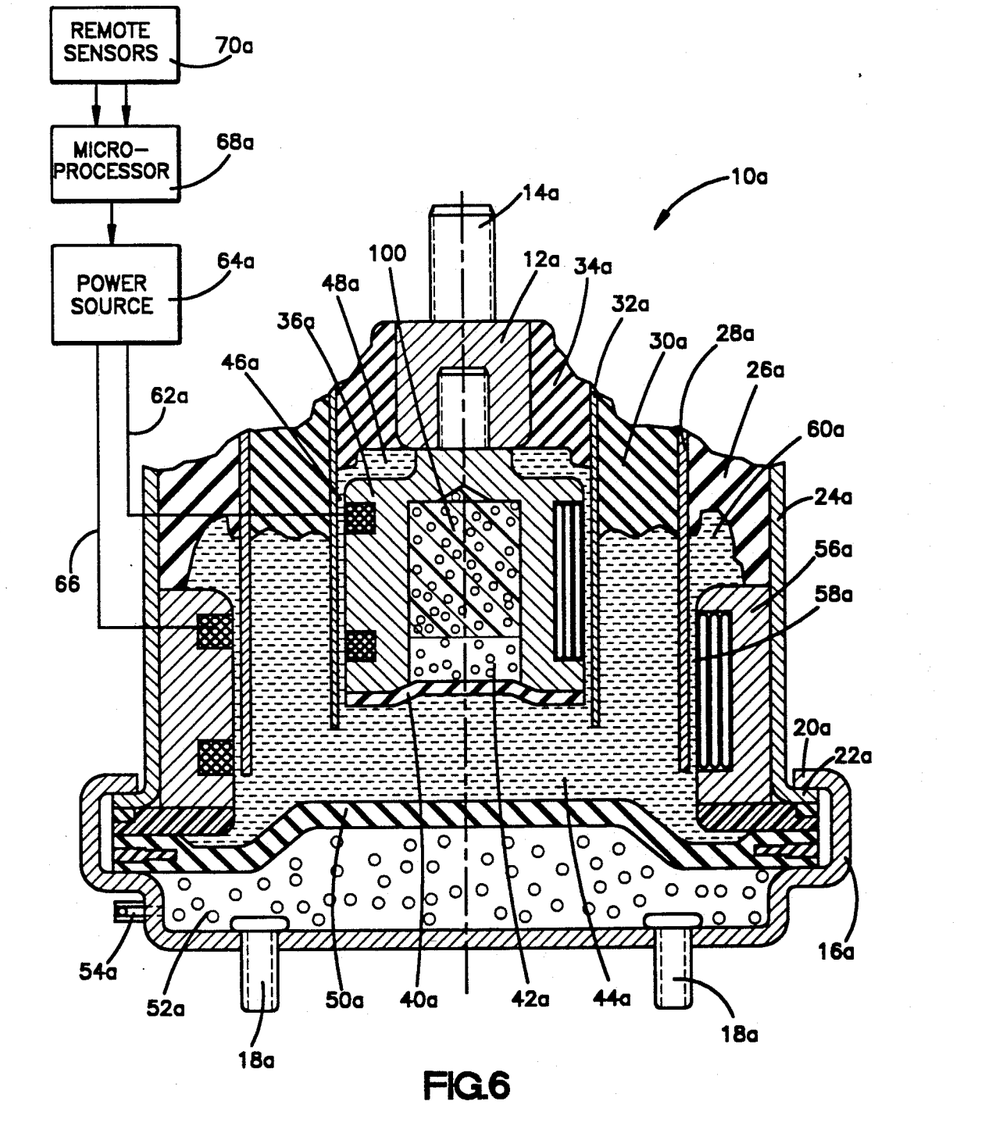
FIG. 6 is a view similar to FIG. 2 of a second embodiment of the present invention.

Another embodiment of the present invention is illustrated in FIG. 6. Since the embodiment of the invention illustrated in FIG. 6 is generally similar to the embodiment of the invention illustrated in FIGS. 1-3, similar numerals are utilized to designate similar components, the suffix letter "a" being associated with the embodiment of FIG. 6 to avoid confusion. As shown in FIG. 6, a foamed cell piece 100 similar to a sponge is located in the inner gas chamber 42a. The foamed cell piece 100 is preferably made of polyurethane material. The foamed cell piece 100 acts to attenuate acoustic noise created by the vehicle engine. The foamed cell piece 100 attenuates acoustic noise by absorbing sound waves propagating from the vehicle engine through the engine mount 10a. Thus, in the embodiment of FIG. 6, both damping of vibrations created by the vehicle engine and attenuating of acoustic noise created by the vehicle engine are achieved.

From the above description of the invention, those skilled in the art will perceive improvements, changes and modifications to the present invention. Such improvements, changes and modifications within the skill of the art are intended to be covered by the appended claims.

Having described the invention, the following is claimed:

1. An apparatus for controlling relative movement of first and second parts, said apparatus comprising:
   means defining a chamber filled with a field responsive fluid, said means including a first flexible wall for connection with one of said parts;
   said chamber having a first control chamber portion defined by a first portion of said first flexible wall and a main chamber portion defined by a second portion of said first flexible wall;
   means defining a first gap for fluid to flow between said first control chamber portion and said main chamber portion upon relative movement of said first and second parts; and
   first field producing means energizeable through an energization range for controlling the shear strength of the field responsive fluid in said first gap to control flow from said first control chamber portion to said main chamber portion to thereby control flexing of said first portion of said first flexible wall and thus relative movement of said first and second parts, said first field producing means being energizeable at a predetermined energization level to block flow of the field responsive fluid through said first gap to thereby stiffen said first portion of said first flexible wall relative to said second portion of said first flexible wall, said first portion of said first flexible wall being inhibited from flexing and said second portion of said first flexible wall flexing relative to said first portion of said flexible well when said first and second parts move relative to each other and said first portion of said first flexible wall is stiffened relative to said second portion of said first flexible wall.

2. An apparatus as defined in claim 1 wherein said means defining said chamber includes a first cylinder and a second cylinder concentric with said first cylinder, said first and second cylinders being movable in said chamber.

3. An apparatus as defined in claim 2 wherein said first and second cylinders are made of magnetically conductive material.

4. An apparatus as defined in claim 1 wherein said chamber has a second control chamber portion defined by a third portion of said first flexible wall, and further including means defining a second gap for fluid to flow between said second control chamber portion and said main chamber portion upon relative movement of said first and second parts.

5. An apparatus as defined in claim 4 further including second field producing means energizeable through an energization range for controlling the shear strength of the field responsive fluid in said second gap to control flow from said second control chamber portion to said main chamber portion to thereby control flexing of said third portion of said first flexible wall and thus relative movement of said first and second parts.

6. An apparatus as defined in claim 1 wherein said means defining said chamber includes a second flexible wall for connection with the other one of said parts, said first portion of said first flexible wall flexing and forcing the field responsive fluid in said first control chamber portion to flow through said first gap into said main chamber portion to thereby force the field responsive fluid against said second flexible wall causing flexing of said second flexible wall in response to relative movement of said parts toward each other.

7. An apparatus for controlling movement of a vehicle engine toward a vehicle chassis, said apparatus comprising:
- a housing connectable to the chassis and a hub connectable to the engine, said hub being movable toward said housing, said housing defining in part a fluid chamber located within said housing and having fluid responsive to a magnetic field contained therein;
- an inner cylinder and an outer cylinder concentric with said inner cylinder, said inner and outer cylinders being movable in the fluid chamber; and
- an outer electromagnetic assembly fixedly connected to said housing and located between said housing and said outer cylinder, an inner electromagnetic assembly fixedly connected to said hub and located in a space interior of said inner cylinder, said outer electromagnetic assembly and said outer cylinder defining an outer annular gap therebetween communicating with the fluid chamber, said inner electromagnetic assembly and said inner cylinder defining an inner annular gap therebetween communicating with the fluid chamber, said inner and outer electromagnetic assemblies being selectively energizeable for controlling the shear strength of the fluid in the inner and outer annular gaps, respectively, and to thereby control movement of said hub toward said housing and thus movement of the vehicle engine toward the vehicle chassis.

8. An apparatus as defined in claim 7 further including an flexible membrane which separates the fluid chamber containing the fluid and an inner gas chamber located in the interior of said inner electromagnetic assembly, fluid flowing through the inner and outer annular gaps into the fluid chamber and thereby causing said flexible membrane to yield and deform in response to said hub moving toward said housing, said flexible membrane yielding and deforming to resist movement of said hub toward said housing and thus movement of the vehicle engine toward the vehicle chassis.

9. An apparatus as defined in claim 8 further including nitrogen gas disposed in the inner gas chamber.

10. An apparatus as defined in claim 9 further including a foamed cell piece made of polyurethane and located in the inner gas chamber, said foamed cell piece acting to attenuate acoustic noise created by the vehicle engine.

11. An apparatus as defined in claim 7 wherein said inner and outer cylinders are made of magnetically conductive material.

12. An apparatus as defined in claim 7 further including a rubber diaphragm which separates the fluid chamber containing said fluid responsive to a magnetic field and an outer gas chamber containing pressurized gas, fluid flowing through the inner and outer annular gaps into the fluid chamber and thereby causing said rubber diaphragm to yield and deform in response to said hub moving toward said housing, said rubber diaphragm yielding and deforming to resist movement of said hub toward said housing and thus movement of the vehicle engine toward the vehicle chassis.

13. An apparatus as defined in claim 7 wherein (i) the shear strength of the fluid in each of the inner and outer gaps is at a value to provide a relatively small amount of damping when said inner and outer electromagnetic assemblies are de-energized and (ii) the shear strength of the fluid in each of the inner and outer gaps is at a value to provide a relatively large amount of damping when said inner and outer electromagnetic assemblies are energized.

14. An apparatus for controlling relative movement of first and second parts, said apparatus comprising:
- means for connection between the parts and defining a fluid chamber and a gap communicating with said fluid chamber, said fluid chamber and said gap being filled with a field responsive fluid, the field responsive fluid flowing through said gap upon relative movement of the parts;
- field producing means selectively energizeable for controlling the shear strength of said field responsive fluid in said gap to thereby control movement between the parts;
- means defining a gas chamber located interior of said field producing means;
- a flexible membrane separating said fluid chamber and said gas chamber; and
- a body of material separate from said flexible membrane and located in said gas chamber for attenuating acoustic noise created by at least one of the parts.

15. An apparatus as defined in claim 14 wherein said field producing means includes a coil of an electromagnet.

16. An apparatus as defined in claim 15 wherein said means defining a gas chamber includes a core around which said coil is wound.

17. An apparatus as defined in claim 14 wherein said means for connection between the parts includes a flexible wall in part defining said fluid chamber, said flexible wall being yieldable to enable the volume of said fluid chamber to change in response to fluid flow through said gap and thus relative movement of the parts.

18. An apparatus as defined in claim 14 wherein said flexible membrane is made of an elastomeric material.

19. An apparatus as defined in claim 14 wherein said gas in said gas chamber is nitrogen.

20. An apparatus as defined in claim 14 wherein said body located in said gas chamber includes a foamed cell piece made of polyurethane.

21. An apparatus for controlling relative movement of first and second parts, said apparatus comprising:
- means defining a chamber filled with a field responsive fluid, said means including a first flexible wall for connection with one of said parts;
- said chamber having a first control chamber portion defined by a first portion of said first flexible wall and a main chamber portion defined by a second portion of said first flexible wall, said chamber having a second control chamber portion defined by a third portion of said first flexible wall;
- means defining a first gap for fluid to flow between said first control chamber portion and said main chamber portion upon relative movement of said first and second parts;
- means defining a second gap for fluid to flow between said second control chamber portion and said main chamber portion upon relative movement of said first and second parts;
- first field producing means energizeable through an energization range for controlling the shear strength of the field responsive fluid in said first gap to control flow from said first control chamber portion to said main chamber portion to thereby control flexing of said first portion of said first flexible wall and thus relative movement of said first and second parts;

second field producing means energizeable through an energization range for controlling the shear strength of the field responsive fluid in said second gap to control flow from said second control chamber portion to said main chamber portion to thereby control flexing of said third portion of said first flexible wall and thus relative movement of said first and second parts; and said second field producing means being energizeable at a predetermined energization level to stop flow of the field responsive fluid through said second gap to thereby prevent flexing of said third portion of said first flexible wall, said second portion of said first flexible wall flexing when said first and second parts move relative to each other and said third portion of said first flexible wall is prevented from flexing.

* * * * *